(12) United States Patent
Duong et al.

(10) Patent No.: US 10,443,390 B2
(45) Date of Patent: Oct. 15, 2019

(54) ROTARY AIRFOIL

(71) Applicant: Pratt & Whitney Canada Corp., Longueuil (CA)

(72) Inventors: Hien Duong, Mississauga (CA); Krishna Prasad Balike, Mississauga (CA); Thomas Veitch, Scarborough (CA); Raman Warikoo, Oakville (CA); Keegan Lobo, Mississauga (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 384 days.

(21) Appl. No.: 14/469,948

(22) Filed: Aug. 27, 2014

(65) Prior Publication Data

US 2016/0061042 A1  Mar. 3, 2016

(51) Int. Cl.
*F01D 5/14* (2006.01)
*F04D 29/32* (2006.01)

(52) U.S. Cl.
CPC .............. *F01D 5/141* (2013.01); *F01D 5/145* (2013.01); *F04D 29/324* (2013.01); *F05D 2240/303* (2013.01); *F05D 2250/71* (2013.01)

(58) Field of Classification Search
CPC ........ F01D 5/141; F01D 5/145; F04D 29/324; F05D 2240/303; F05D 2250/71
USPC ........ 416/223 A, 223 R, 238, 242–243, 234, 416/DIG. 2
See application file for complete search history.

(56) References Cited

U.S. PATENT DOCUMENTS

| | | | |
|---|---|---|---|
| 3,706,512 A | 12/1972 | Strelshik | |
| 4,585,395 A * | 4/1986 | Nourse | F01D 5/141 415/181 |
| 4,682,935 A * | 7/1987 | Martin | F01D 5/141 415/181 |
| 5,167,489 A | 12/1992 | Wadia et al. | |
| 5,769,607 A | 6/1998 | Neely et al. | |
| 6,071,077 A | 6/2000 | Rowlands | |
| 6,331,100 B1 * | 12/2001 | Liu | F01D 5/141 416/223 A |
| 8,147,207 B2 | 4/2012 | Orosa et al. | |
| 8,167,567 B2 | 5/2012 | Kirchner et al. | |

(Continued)

FOREIGN PATENT DOCUMENTS

| | | |
|---|---|---|
| EP | 1754859 | 2/2007 |
| EP | 2080909 | 7/2009 |

(Continued)

OTHER PUBLICATIONS

Extended European Search Report corresponding to EP Application No. 15182551.0-1610 dated Jan. 29, 2016.

*Primary Examiner* — Michael R Reid
(74) *Attorney, Agent, or Firm* — Norton Rose Fulbright Canada L.L.P.

(57) ABSTRACT

A rotary airfoil in a gas turbine engine is provided. The airfoil includes opposed pressure and suction sides joined together at chordally opposite leading and trailing edges. The pressure and suction sides extend in a span direction from a root to a tip. An axial component of a center of gravity of a cross-section taken chordally toward the tip of the airfoil being upstream relative to an axial component of a center of gravity of a cross-section taken chordally toward the root of the airfoil. A method for forming such blade is also presented.

20 Claims, 12 Drawing Sheets

(56) References Cited

U.S. PATENT DOCUMENTS

| | | |
|---|---|---|
| 8,464,426 B2 | 6/2013 | Kirchner et al. |
| 9,732,762 B2 * | 8/2017 | Duong ................. F04D 29/384 |
| 9,765,795 B2 * | 9/2017 | Duong ................. F04D 29/384 |
| 2010/0143139 A1 | 6/2010 | Pandey et al. |
| 2012/0243975 A1 | 9/2012 | Breeze-Stringfellow et al. |
| 2012/0263599 A1 | 10/2012 | Sugimura et al. |
| 2014/0248155 A1 | 9/2014 | Merville et al. |
| 2014/0341749 A1 | 11/2014 | Perrot et al. |

FOREIGN PATENT DOCUMENTS

| | | |
|---|---|---|
| EP | 2199543 | 6/2010 |
| WO | WO2009/103528 | 8/2009 |
| WO | WO2013050724 | 4/2013 |
| WO | WO2013/150243 | 10/2013 |

* cited by examiner

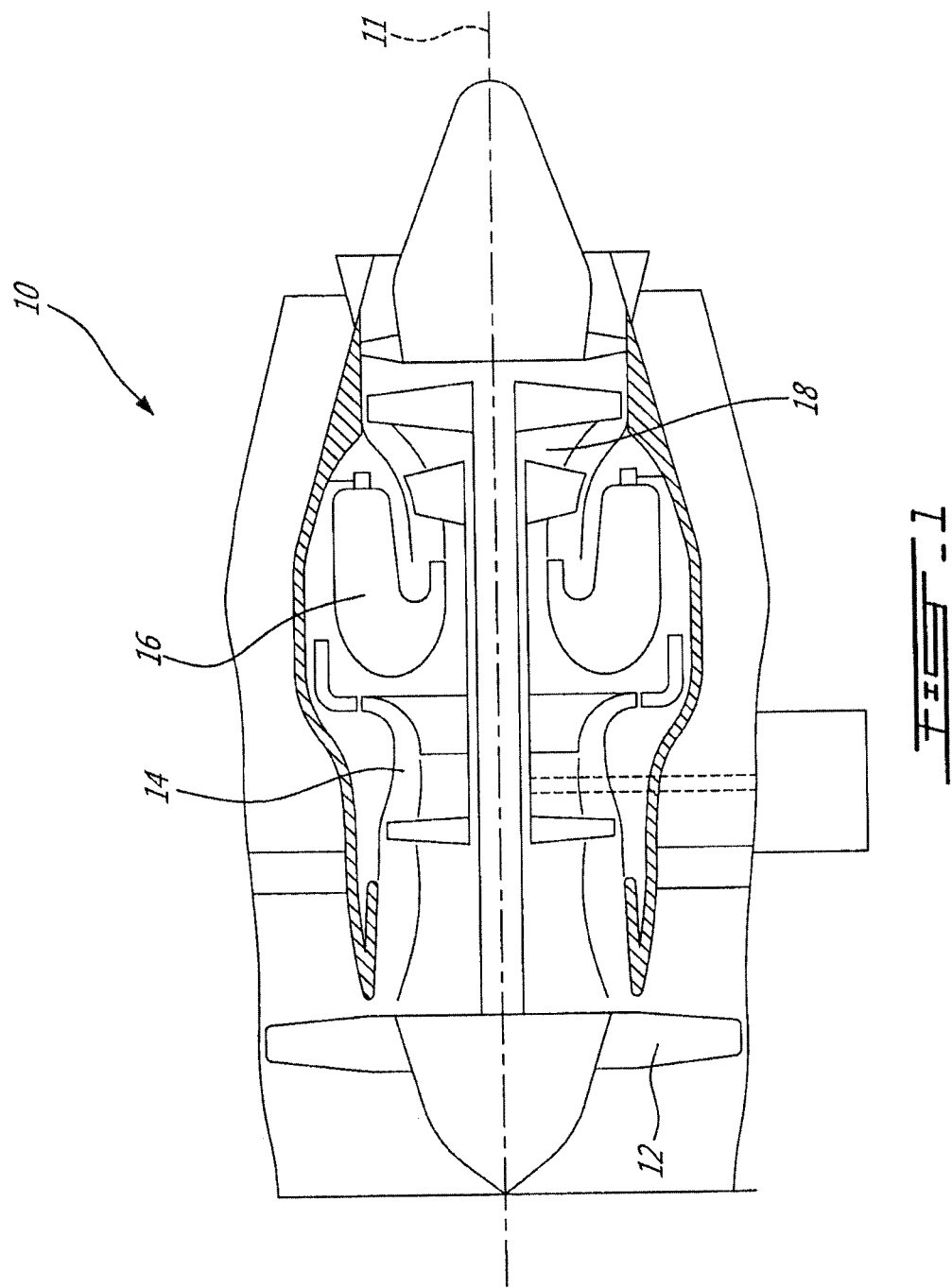

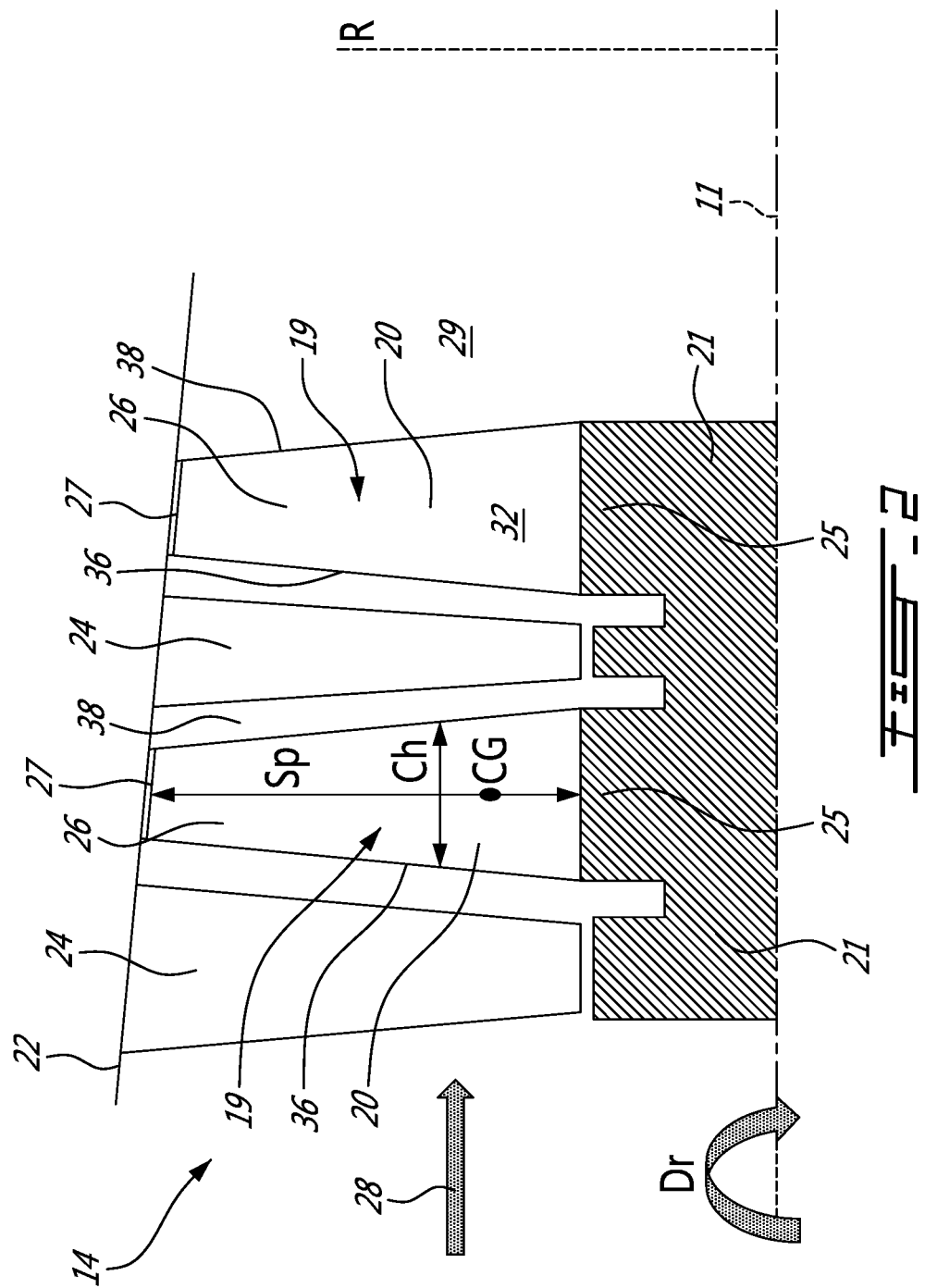

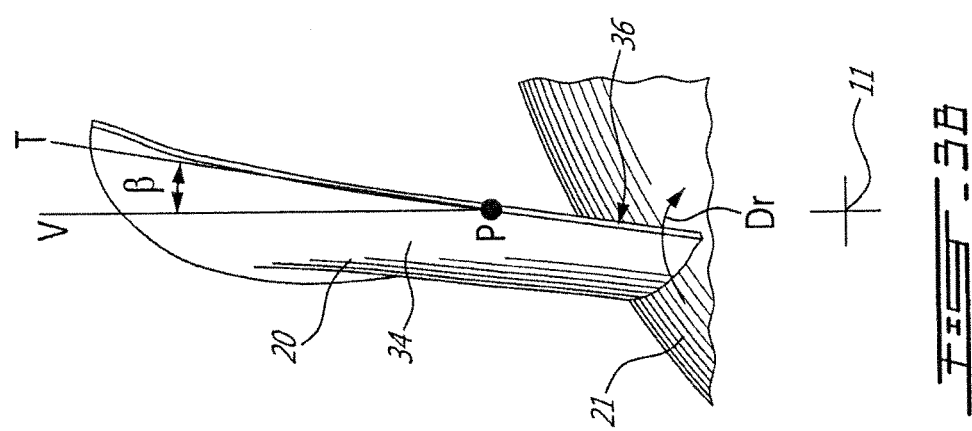

ROTARY AIRFOIL

TECHNICAL FIELD

The application relates generally to rotary airfoils and, more particularly, to rotary airfoils in gas turbine engines.

BACKGROUND OF THE ART

In blades with forward sweep, the center of gravity of the tip section is naturally moved upstream of the hub or root section. Due to the overhung of tip mass, an unbalance of stress especially at the root is present. A conventional design method to remedy to this problem may include increasing thickness near the leading edge in order to reduce stresses. However, increasing the thickness at the leading edge presents a few inconveniences from an aerodynamics point of view. Among these inconveniences are pressure loss increase, and reduced throat area (also known as chocking). Increased leading edge thickness in turn may reduce engine performance and stall margin.

SUMMARY

In one aspect, there is provided a rotary airfoil in a gas turbine engine, the airfoil comprising: opposed pressure and suction sides joined together at chordally opposite leading and trailing edges, the pressure and suction sides extending in a span direction from a root to a tip; and an axial component of a center of gravity of a cross-section taken chordally toward the tip of the airfoil being upstream relative to an axial component of a center of gravity of a cross-section taken chordally toward the root of the airfoil.

In another aspect, there is also provided a gas turbine engine comprising: a compressor section including a plurality of rotors, each of the plurality of rotors including a hub, the hubs being aligned axially, each of the rotors including a plurality of blades extending radially from the hub, the blades including an airfoil portion, the airfoil portion comprising: opposed pressure and suction sides joined together at chordally opposite leading and trailing edges, the pressure and suction sides extending in a span direction from a root to a tip; and an axial component of a center of gravity of a cross-section taken chordally toward the tip of the airfoil being upstream relative to an axial component of a center of gravity of a cross-section taken chordally toward the root of the airfoil.

In another aspect, there is provided a method of forming a rotary blade having opposed pressure and suction sides joined together at chordally opposite leading and trailing edges, the pressure and suction side extending in a span direction from a root to a tip, the method comprising: forming an airfoil having an axial component of a center of gravity of a cross-section taken chordally toward the tip of the airfoil being upstream relative to an axial component of a center of gravity of a cross-section taken chordally toward the root of the airfoil.

DESCRIPTION OF THE DRAWINGS

Reference is now made to the accompanying figures in which:

FIG. 1 is a schematic cross-sectional view of a gas turbine engine;

FIG. 2 is a schematic of a portion of a compressor of the gas turbine engine of FIG. 1;

FIGS. 3A and 3B are schematics of a blade for the compressor of FIG. 2 annotated to show a sweep angle α (FIG. 3A) and a dihedral angle β (FIG. 3B);

DETAILED DESCRIPTION

Figure 3A:
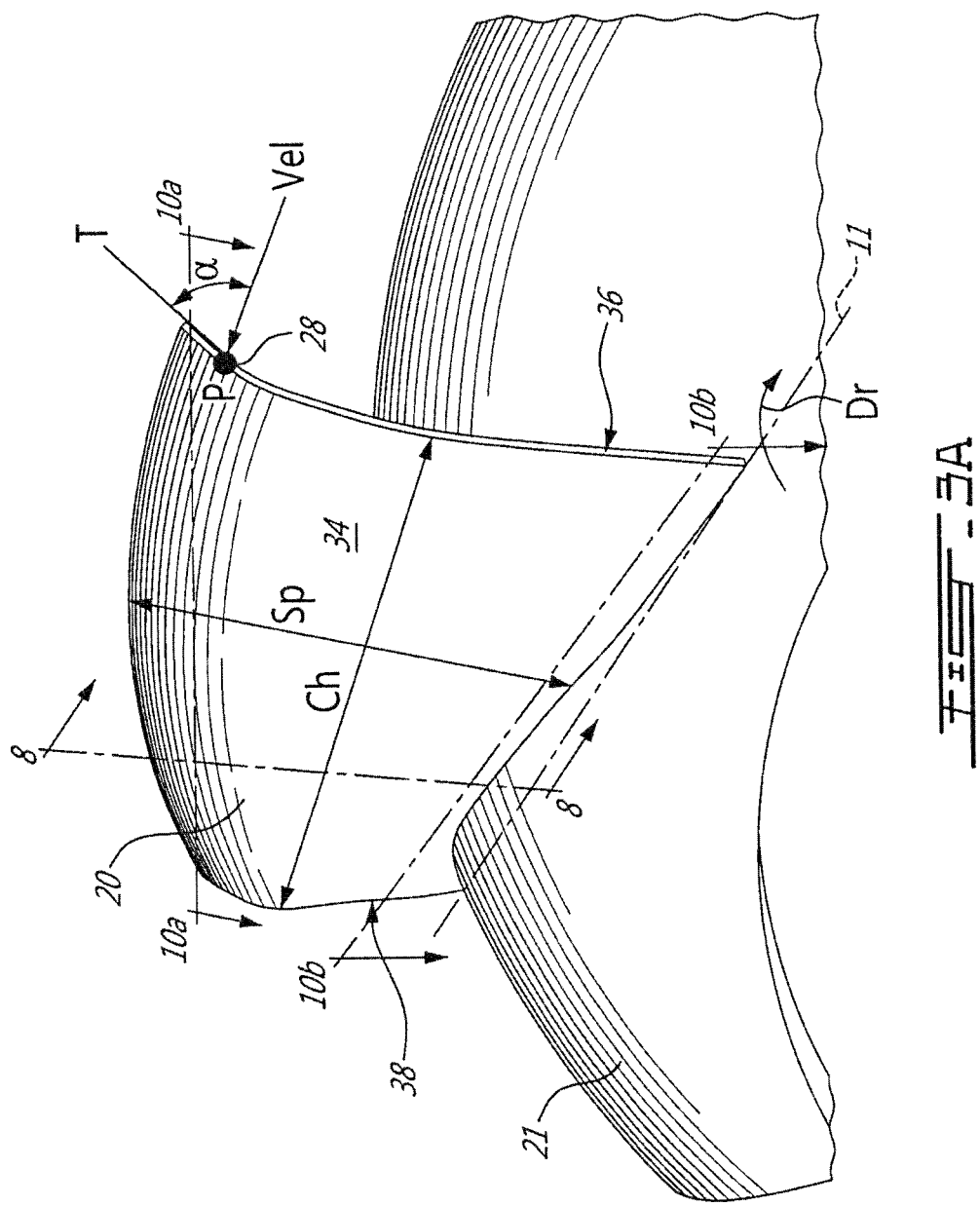

FIG. 1 illustrates a gas turbine engine 10 of a type preferably provided for use in subsonic flight, generally comprising in serial flow communication along a centerline 11: a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

FIG. 2 illustrates a portion of the compressor section 14 including a plurality of rotors 19 (only two of the rotors being shown). The rotor 19 is an integrally bladed rotor including a plurality of circumferentially distributed blades 20 extending radially from an annular hub 21. The blades 20 could be integrally formed with the hub 21 or could be connected thereto. The blades 20 are supported in a circumferentially extending row around hub 21 for rotation about the centerline 11 of the engine 10 (as depicted by arrow Dr in FIG. 2). As shown in FIG. 2, an annular compressor casing 22 (also known as shroud) surrounds the compressor blades 20. The compressor section 14 also includes a plurality of circumferential rows or stages of stator vanes 24 disposed between the plurality of compressor blades 20 in an alternating fashion. The stator vanes 24 project radially inwardly from the compressor casing 22.

Each of the blades 20 includes a root 25 joining the blade 20 to the hub 21 and an airfoil portion 26 extending from the root 25. The airfoil portion 26 includes a tip 27 at a radially outer end thereof. The tip 27 is spaced radially from the compressor casing 22 to provide tip clearance. The hub 21 and annular casing 22 define inner and outer boundaries, respectively, for channeling a flow of air 28 through the compressor 14. The flow of air 28 is generally aligned with the centerline 11. The hub 21 forms with the compressor casing 22 a converging annular flow channel 29 for compressing air driven through the compressor section 14 by the blades 20. As such, the front blades 20 (i.e. the upstream stages of compressor blades) have a longer span Sp than the rear blades 20 (i.e. the downstream stages of compressor blades, the ones just upstream of the combustor 16).

The airfoil portions 26 of the blades 20 include each a pressure side 32 and an opposed suction side 34. The pressure side 32 and suction side 34 extend in a span direction from the root 25 to the tip 27. The airfoil portion 26 further includes a leading edge 36 and a trailing edge 38 defined at the junction of the pressure side 32 and the suction side 34. The airfoil portion 26 also defines the span Sp extending between the root 25 and the tip 27, and a chord Ch extending transversally between the leading edge 36 and the trailing edge 38. When in operation, the blade 20 rotates in the direction of rotation Dr with the suction side 34 disposed forward of the pressure side 32. When the blades 20 are in operation connected to the hub 21, the root 25 is commonly referred to as the hub 21.

Turning to FIGS. 3A and 3B, the airfoil portion 26 may be oriented at different positions relative to the flow of air 28 in order to optimise efficiency of the rotor 19. The airfoil portion 26 may also be twisted or leaned. Different angles may then be used to characterise the shape of the airfoil portion 26.

A sweep angle $\alpha$ and a dihedral angle $\beta$ may thus be defined. The sweep angle $\alpha$ and dihedral angle $\beta$ can be defined at any point P along the leading edge 36. With reference to FIG. 3A, at any point P along the leading edge 36 the angle between the local velocity vector Vel of the incoming flow 28 and a tangent T to the leading edge 36 may define the sweep angle $\alpha$. Forward sweep may be defined when the angle ($\alpha$ −90°) is negative. Similarly, rearward sweep occurs when the angle ($\alpha$ −90°) is positive. With reference to FIG. 3B, the dihedral angle $\beta$ may be defined as the angle between a vertical V and the tangent T to leading edge 36 at any point P. The vertical V is confounded with the radial direction R (shown in FIG. 2). The dihedral angle $\beta$ is positive in the direction of rotation Dr.

Flow around the airfoil portion 26 is complex. Depending on the shape of the airfoil portion 26 and the flow conditions, transonic flow may be present in the compressor section 14 (i.e. existence of subsonic flow in some portions of the compressor section 14, and sonic and supersonic flow in other portions of the compressor section 14). As a result of these flow conditions, boundary layer build up may occur at the tip 27 of the blade 20 which may influence the efficiency of the compressor section 14.

Tip blade lean (in direction of rotation Dr) and forward sweep (in direction opposite to flow 28) may be used in the design of the blades 20 to alter the shock structure and reduce boundary layer accumulation, both of which may contribute to improvement in performance and increased stall margin. The stall initiation point may be defined as the point at which the compressor section 14 can no longer sustain an increase in pressure such that the gas turbine engine 10 stalls.

Having a blade that is swept forward may provide several benefits to the tip 27. First, in terms of shock, the forward sweep may affect bow shock by sweeping the leading edge 36 while the passage shock is altered via a change in the shock location. The forward sweep thus may cause the shock to become more swallowed, which in turn, may increase the stall margin.

Second, increased flow toward the tip 27 may subject the tip 27 more toward negative incidence, reduce front loading and may reduce tip clearance flow. As mentioned above, tip clearance is the space defined between the tip 27 of the blade and the compressor casing 22. The portion of the flow of air 28 which escapes from the flow channel 29 through the tip clearance may reduce the ability of the compressor section 14 to sustain pressure rise, increase downstream flow blockage and may reduce its stall margin. The downstream blades 20 may have an increased tip clearance relative to the upstream blades 20 which may increase tip clearance flow.

Third, forward sweep at the tip 27 may allow the tip 27 to "grab" flow sooner than other section resulting in lower axial diffusion and less boundary layer accumulation.

Fourth, because of the centrifugal effects produced by the rotor, there may be a migration of secondary flow along blade's 20 surface from the hub 21 to tip 27, which may result in a thick tip boundary layer build up. While secondary flow can be affected by radial loading, any secondary flow migrating from hub 21 to tip 27 may also be reduced with forward sweep as it will likely be swept downstream before reaching tip 27.

Fifth, in a multistage environment such as the one partially shown in FIG. 2, sweep may improve overall efficiency with improved interaction between rows of blades 20.

The blade 20 having a forward sweep, flow has a positive incidence reduced compared to a blade with lesser or no forward sweep. While lesser positive incidence may improve stall margin, it may reduce flow chocking because of a reduction in effective area seen by flow. In a multistage compressor such as the one of FIG. 2, the throat area may be adjusted to counter this effect. Having an airfoil portion 26 that is leaned may also provide benefits to the tip 27. Blade's lean may reduce the acute suction side dihedral angle. Blade lean may be as effective as forward sweep in reducing shock/boundary layer/tip clearance interaction.

A combination of sweep and blade lean may thus be adopted. In a multistage environment, certain physical spacing is required between blade rows for structural reasons. Unless the compressor length can be increased to accommodate a forward swept blade (at the expense of engine weight and cost) this imposes a limitation on how much forward sweep a rotor can employ. Thus to maximize the benefit of sweep/lean in a confined axial space, blade lean may be maximized (provided rotor remains structurally acceptable).

The airfoil portion 26 described herein is shaped to accommodate the structural limitations imposed by the design of the compressor section 14 while aiming at reducing at least some of the losses induced by the flow around the airfoil portions 26. As a result, the airfoil portions 26 presented herein may have, among other design features presented below, a ratio of the sweep angle $\alpha$ over the dihedral angle $\beta$ may be below 1. According to an embodiment, the ratio may be comprised between 0 and 1. The blade 20 shown herein may also have a dihedral tip with a reverse direction, and/or an axial component of a center of gravity of a cross-section taken chordally toward the tip of the airfoil being upstream relative to an axial component of a center of gravity of a cross-section taken chordally toward the root of the airfoil.

Turning now to FIGS. 4 to 8, several parameters defining the airfoil portion 26 will be discussed. FIGS. 4 to 8 show only one example of parameters for the airfoil portion 26.

Figure 4:
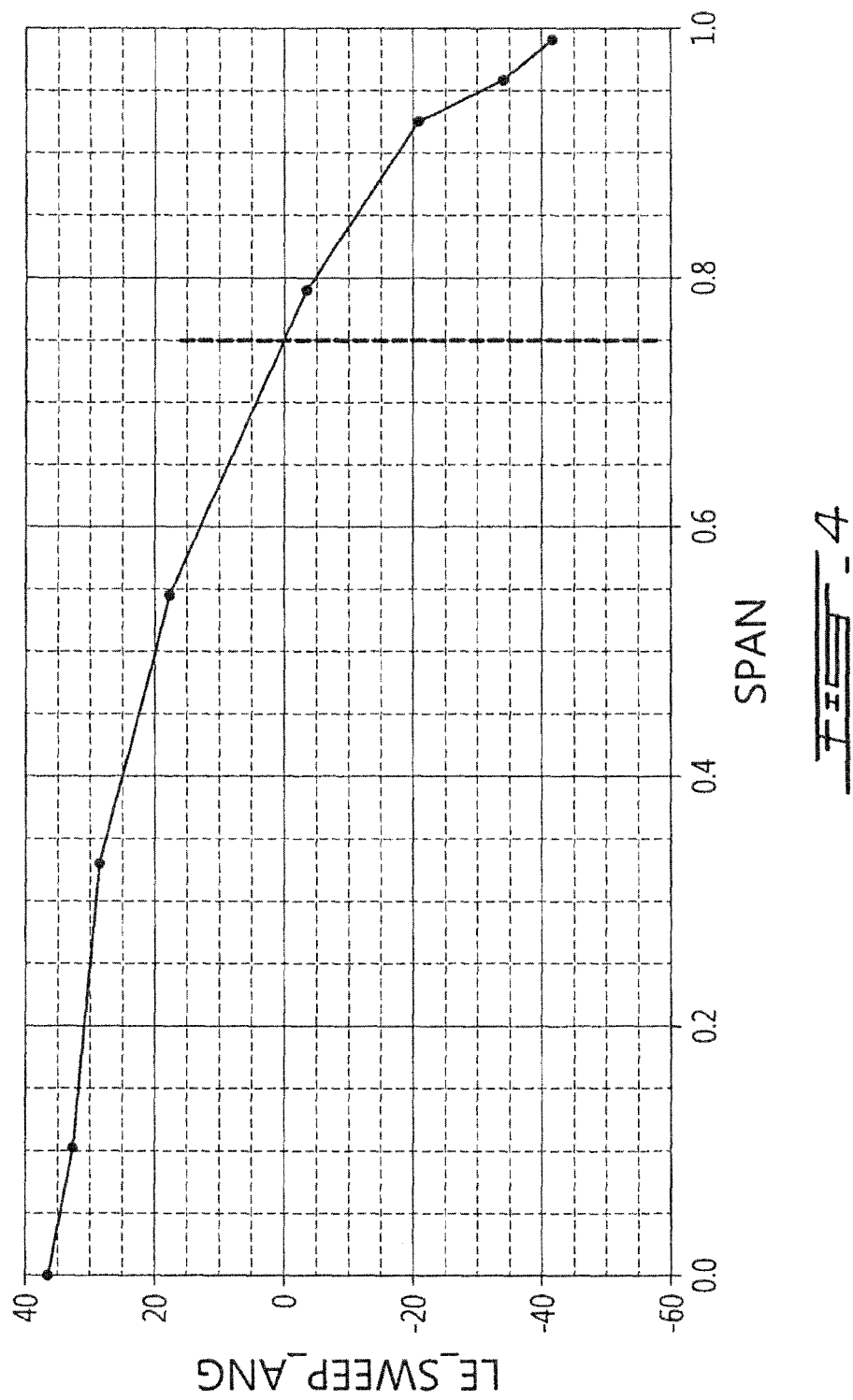
FIG. 4 is a graph of a leading edge sweep angle α relative to a span Sp of a blade of the compressor of FIG. 2.

In FIG. 4, the sweep angle $\alpha$ of the leading edge 36 of the airfoil portion 26 is plotted against the span Sp at the leading edge 36 of the airfoil portion 26. From 0 to about 75% of the span Sp, the airfoil portion 26 is swept rearward (sweep angle $\alpha$ is positive). From about 75% to the tip 27, the airfoil portion 26 is swept forward (sweep angle $\alpha$ is negative). The increase of sweep along the span Sp is monotonic. A transition between rearward and forward sweep may depend on the application of the rotor 19, among many parameters rotor Mach number and pressure ratio it has to produce. In one embodiment, the forward sweep S could be between 5 and 45% of the span Sp of the airfoil portion 26. In one embodiment, the forward sweep S could be between 10 and 35% of the span Sp of the airfoil portion 26.

Forward sweep for transonic rotors may reduce secondary flow migration from the hub 21 to the tip 27. As a result, at the tip 27, there is less mixing loss due to interaction between the tip leakage flow, shock and secondary flow. Lower mixing losses induce lower flow blockage which could lead to improve flow capacity at high speeds. Also, forward sweep may pull flow toward the tip 27 and as a result improves rotor stall margin at both high and low (part) speeds.

Forward sweep for subsonic rotors may also reduce secondary flow migration from the hub 21 to the tip 27, and mixing losses due to interaction between tip leakage flow with secondary flow. The rotor 19 may thus be less sensitive to tip clearance increase. Forward sweep may pull flow toward the tip 27 and as a result improves rotor stall margin at both high and low (part) speeds.

Figure 5:
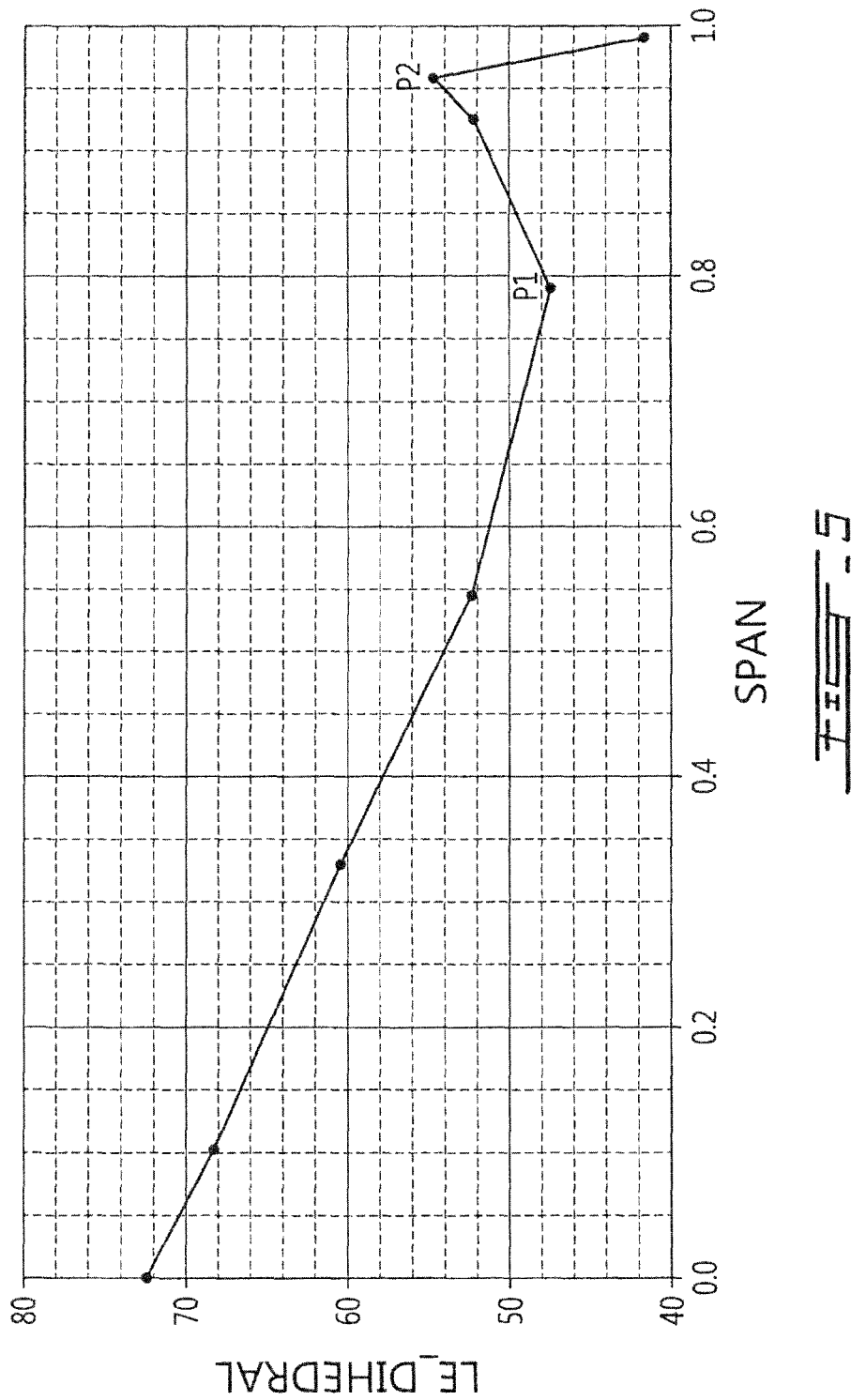
FIG. 5 is a graph of a leading edge dihedral angle β relative to a span Sp of a blade of the compressor of FIG. 2.

In FIG. 5, the dihedral angle $\beta$ of the leading edge 36 of the airfoil portion 26 is plotted against the span Sp at the leading edge 36 of the airfoil portion 26. The dihedral angle $\beta$ is a positive dihedral angle, decreasing from the hub 21 (i.e. 0 on the span Sp axis) to the tip 27 (i.e. 1 on the span Sp axis). The dihedral angle $\beta$ is about 72 degrees at the hub 21 and about 42 degrees at the tip 27. The dihedral angle $\beta$ may be comprised between 40 and 70 degrees. While the dihedral angle $\beta$ is shown herein to decrease from hub 21 to tip 27, it could instead increase.

Figure 8:
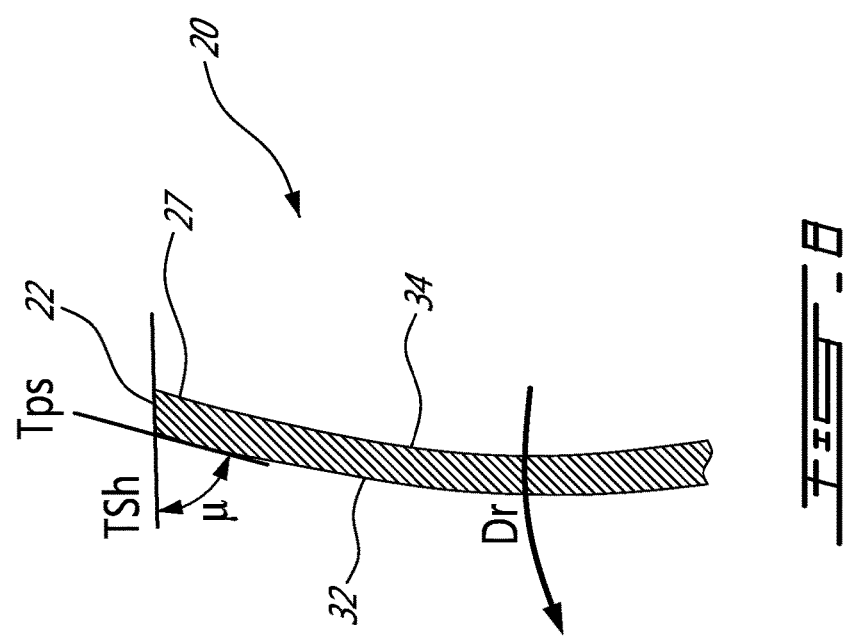
FIG. 8 is a schematic cross-sectional view of the blade of the compressor of FIG. 2 taken along line 8-8 in FIG. 3A.

Opposite to the sweep angle $\alpha$, the dihedral angle $\beta$ in this example, does not evolve monotonically along the span Sp at the leading edge 36. In the embodiment shown in FIG. 5, a direction of the dihedral angle $\beta$ is reversed locally twice near the tip 27, i.e. the dihedral angle $\beta$ span-wise distribution has a first inflection point P1 and a second inflection point P2. From 0% span Sp to about 80% span Sp (point P1), the dihedral angle $\beta$ decreases. From about 80% span Sp to about 95% span Sp (point P2), the dihedral angle $\beta$ increases, and from 95% span Sp to 100% span Sp, the dihedral angle $\beta$ decreases again. Under centrifugal force and thermal effects, the rotor 19 may expand radially. Large amounts of dihedral angle $\beta$ may cause the blade 20 to rub into the casing 22 during high speed conditions. Having at least one inflection point P1 may affect a rub angle $\mu$ at the tip 27 of the blade 20 with the casing 22, and may be beneficial for avoiding additional deflection of the airfoil portion 26 when the blade 20 is rubbing into the casing 22. FIG. 8 shows a position of the tip 27 of the airfoil portion 26 relative to the casing 22. The casing 22 is illustrated in FIG. 8 by a line TSh tangent to the casing 22, and the rub angle $\mu$ may be defined between a tangent Tps to the pressure side 32 and the tangent TSh to the casing 22. While in the particular illustration of FIG. 8, the tangent TSh to the casing 22 seems to match a tangent to the tip 27, it is contemplated that the tangent to the tip 27 could be at an angle with the tangent TSh to the casing 22. Computations have determined that the rub angle $\mu$ is decreased when the blade 20 includes at least one inflection point in the dihedral angle $\beta$ span-wise distribution. While the particular illustration of FIG. 8 shows schematically a rub angle $\mu$ lesser than 90 degrees, it is contemplated that the rub angle $\mu$ could be 90 or greater than 90 degrees.

By having a non-monotonic decrease (or in other embodiments non-monotonic increase) of the dihedral angle $\beta$ toward the casing 22, the rub angle $\mu$ may be decreased which in turn may decrease damages or force resulting from the rubbing are decreased. In other terms, decreasing rub angle may decrease the risk of damage to the casing 22 (i.e. adrabable) during a rub by reducing the extent to which the blade elongates as a result of plowing into the casing 22 during a rub. In turn, the compressor section 14 may become more efficient. Computational Fluid Dynamics analyses supported by rig/engine test data have shown that the change to surge margin and performance may be insignificant with this type of dihedral angle $\beta$ distribution.

A second inflection point P2 in the dihedral angle $\beta$ span-wise distribution may be used to obtain a more optimised rub angle $\mu$ than would the blade 20 have with the first inflection point P1 only. The second inflection point P2 may be omitted and airfoil portion 26 may have only one inflection point in the dihedral angle $\beta$ span-wise distribution. The dihedral angle $\beta$ span-wise distribution may also have more than two inflection points. While the inflections in dihedral angle $\beta$ span-wise distribution are shown in FIG. 5 to take place at the tip 27, it is contemplated that the inflections could be taking place mid-span or toward the hub 21. The inflections of the dihedral angle $\beta$ span-wise distribution is shown herein applied to a blade having a ratio of sweep angle $\alpha$ over dihedral angle $\beta$ below 1, but it is contemplated that the inflection(s) of the dihedral angle $\beta$ span-wise distribution could be applied to a variety of blades not bounded to the above ratio of sweep angle $\alpha$ over dihedral angle $\beta$. In one embodiment, the inflection(s) of the dihedral angle $\beta$ span-wise distribution may occur between 5 to 10% of the span Sp.

The high tip dihedral angle $\beta$ may increase tensile stress at the hub 21 on the pressure side 32 of the airfoil portion 26 and compression stress on the suction side 34 at the hub 21 of the airfoil portion 26. As discussed below with reference to FIGS. 10 and 11, a thickness distribution along cross-sections of the blade 20 may be determined to at least reduce these compressive stresses and tension stresses.

Figure 6:
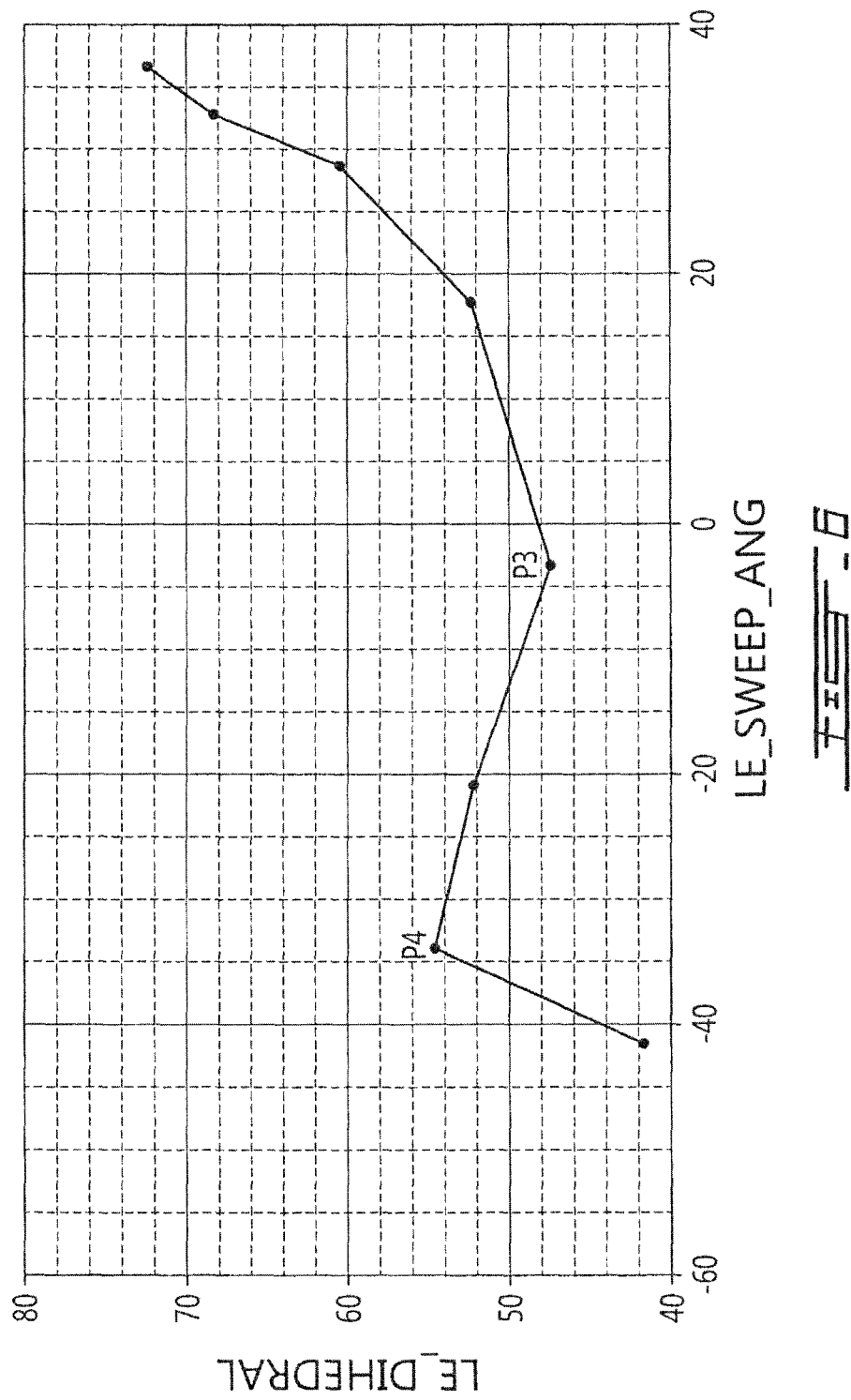
FIG. 6 is a graph of a leading edge sweep angle α relative to a leading edge dihedral angle β of a blade of the compressor of FIG. 2.

FIG. 6 shows a distribution of the leading edge dihedral angle $\beta$ relative to the leading edge sweep angle $\alpha$. The distribution shows two inflection points P3, P4 which correspond to the two inflection points P1, P2 of the dihedral angle $\beta$ span-wise distribution.

Figure 7:
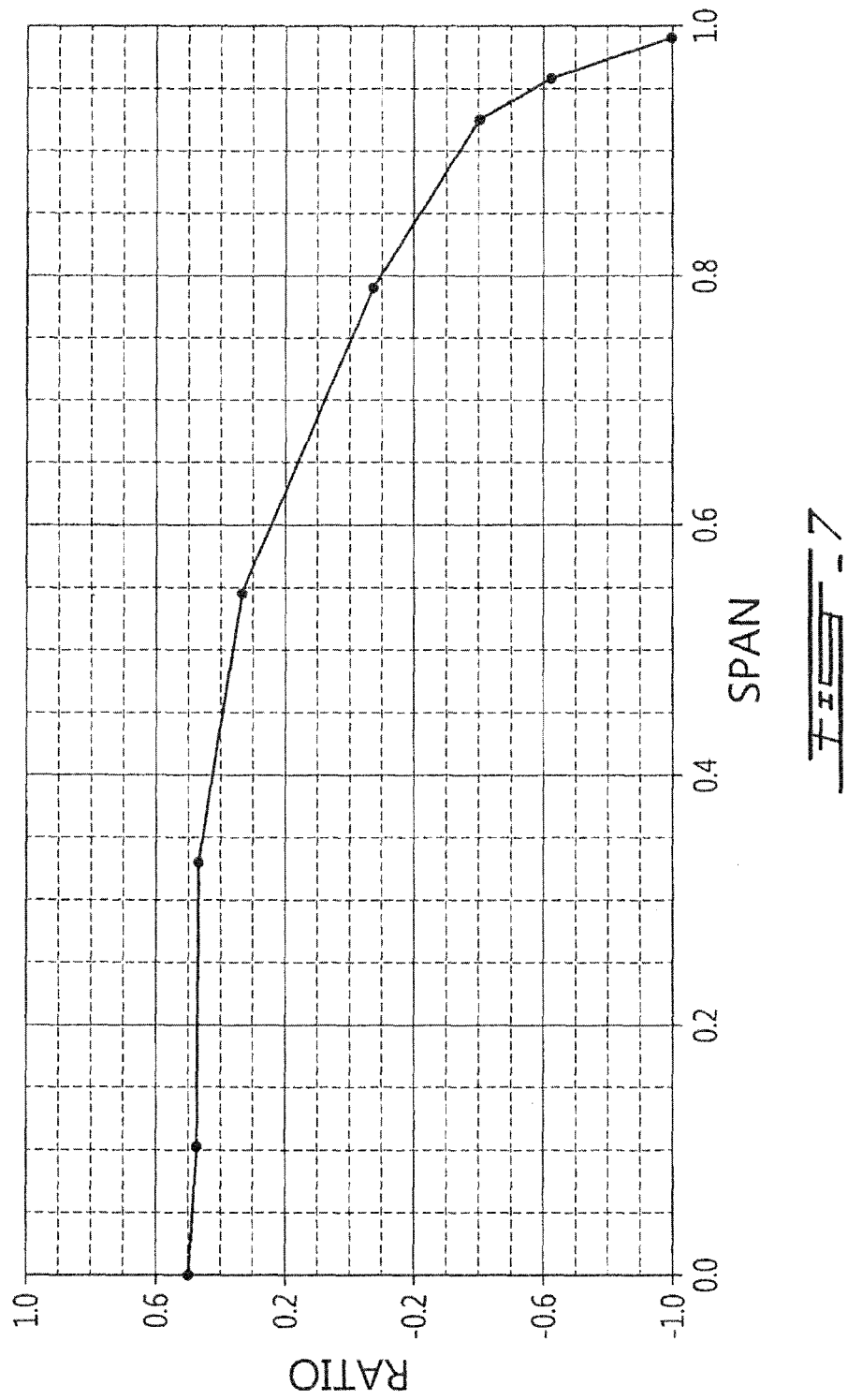
FIG. 7 is a graph of a ratio of a leading edge sweep angle α over a leading edge dihedral angle β relative to a span Sp of the blade of the compressor of FIG. 2.

FIG. 7 shows a ratio of the sweep angle $\alpha$ over the dihedral angle $\beta$ as a function of the span Sp of the airfoil portion 26. The ratio decrease monotonically from the hub 21 to the tip 27. The ratio is below 0.5. In other embodiments, the ratio could be below 1. It is contemplated that the ratio could not be monotonic. This graph shows that the dihedral angle $\beta$ is always larger than the sweep angle $\alpha$ for the blade 20 described herein. This ratio is in response to spatial limitations in the rotor 19, where forward sweep is limited, as described above.

Figure 9:
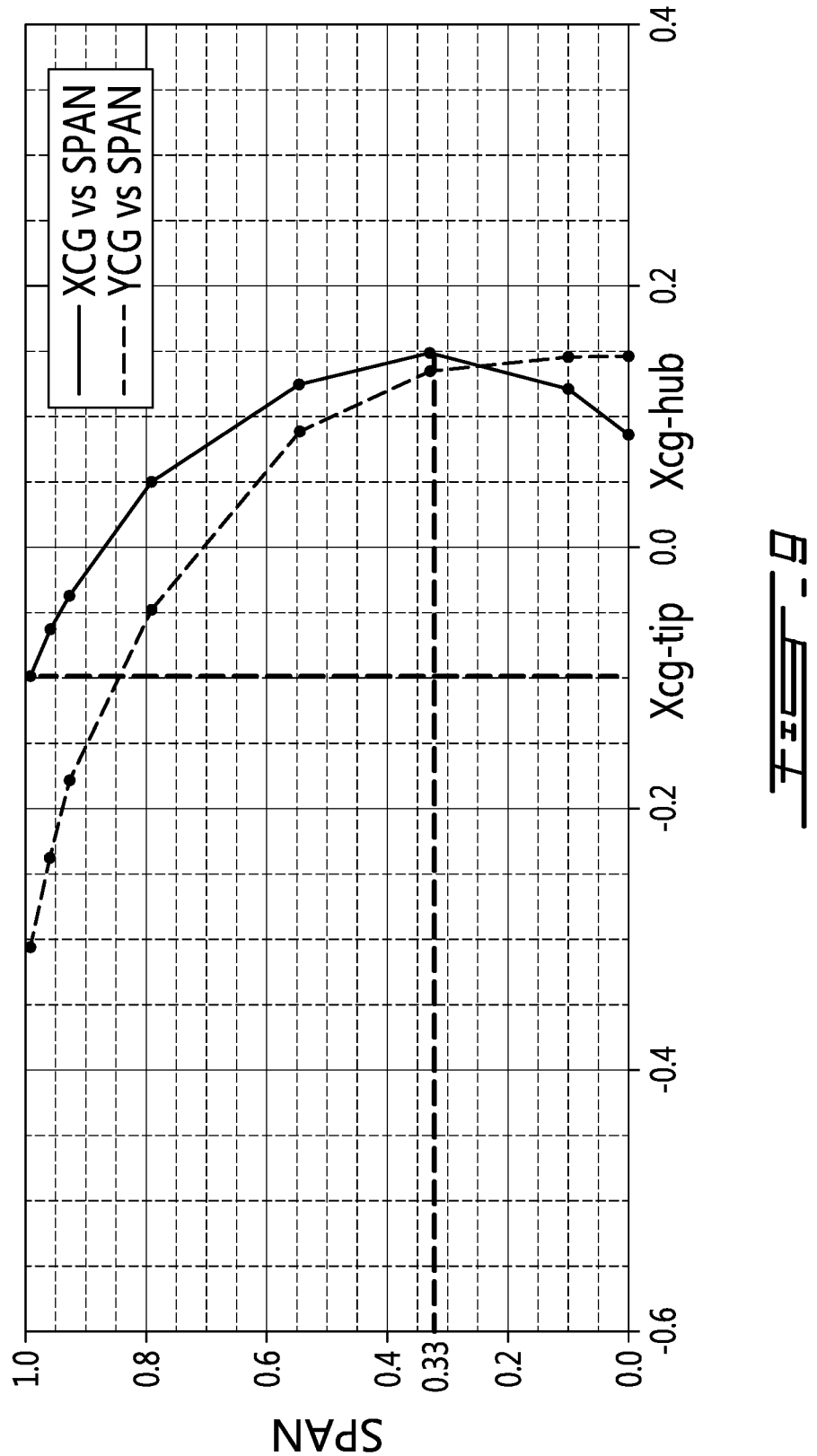
FIG. 9 is a graph of a span Sp relative to axial and tangential center of gravity Xcg, Ycg components of the blade of the compressor of FIG. 2.

FIG. 9 shows the center of gravity CG of the airfoil portion 26 at different sections along the span Sp of the airfoil portion 26. The center of gravity CG can be projected onto an axial axis (i.e. parallel to the engine axis 11) (Xcg) and tangential axis (Ycg). Xcg and Ycg are defined as the axial distance and the tangential distance of the center of gravity CG of any particular span-wise section. Xcg represents axial sweep, while Ycg represents tangential lean. The abscises axis of the plot represents a distance (in inches) of the center of gravity CG of a given cross-section relative to an arbitrary 0. The ordinates axis of the plot represents a position (normalised) of that given cross-section along the span Sp. Positive values on the abscises axis of the plot correspond to deviation of the center of gravity CG in the direction of flow 28, and negative values on the abscises axis of the plot correspond to deviation of the center of gravity CG in a direction opposite to the direction of flow 28.

Referring more specifically to the Xcg distribution, the Xcg of the airfoil portion 26 at the hub 21, Xcg-hub, is disposed downstream relative to the Xcg of the airfoil portion 26 at the tip 27, Xcg-tip. In the example shown in FIG. 9, the Xcg at the hub 21 (Xcg-hub) is between 0.05 and 0.1 inch on the axial axis 11, while the Xcg at the tip 27 (Xcg-tip) is at —0.1 inch on the axial axis 11. Starting at about 65% of the span Sp of the airfoil portion 26, any point of the airfoil portion 26 above that is disposed upstream. The Xcg distribution shows that the Xcg at the hub 21 is downstream relative to the Xcg at the tip 27 is a consequence of the forward sweep imparted to the blade 20. It is contemplated that blades other than the blade 20 could have such Xcg distribution. For example, radial or backward sweep rotors with hub section thicken further to the rear could have this distribution. The dashed line at 0.33 of the span is the location along the span (radical ocation or section) where the values of Xcg and Ycg are approximately the same.

Figure 10:
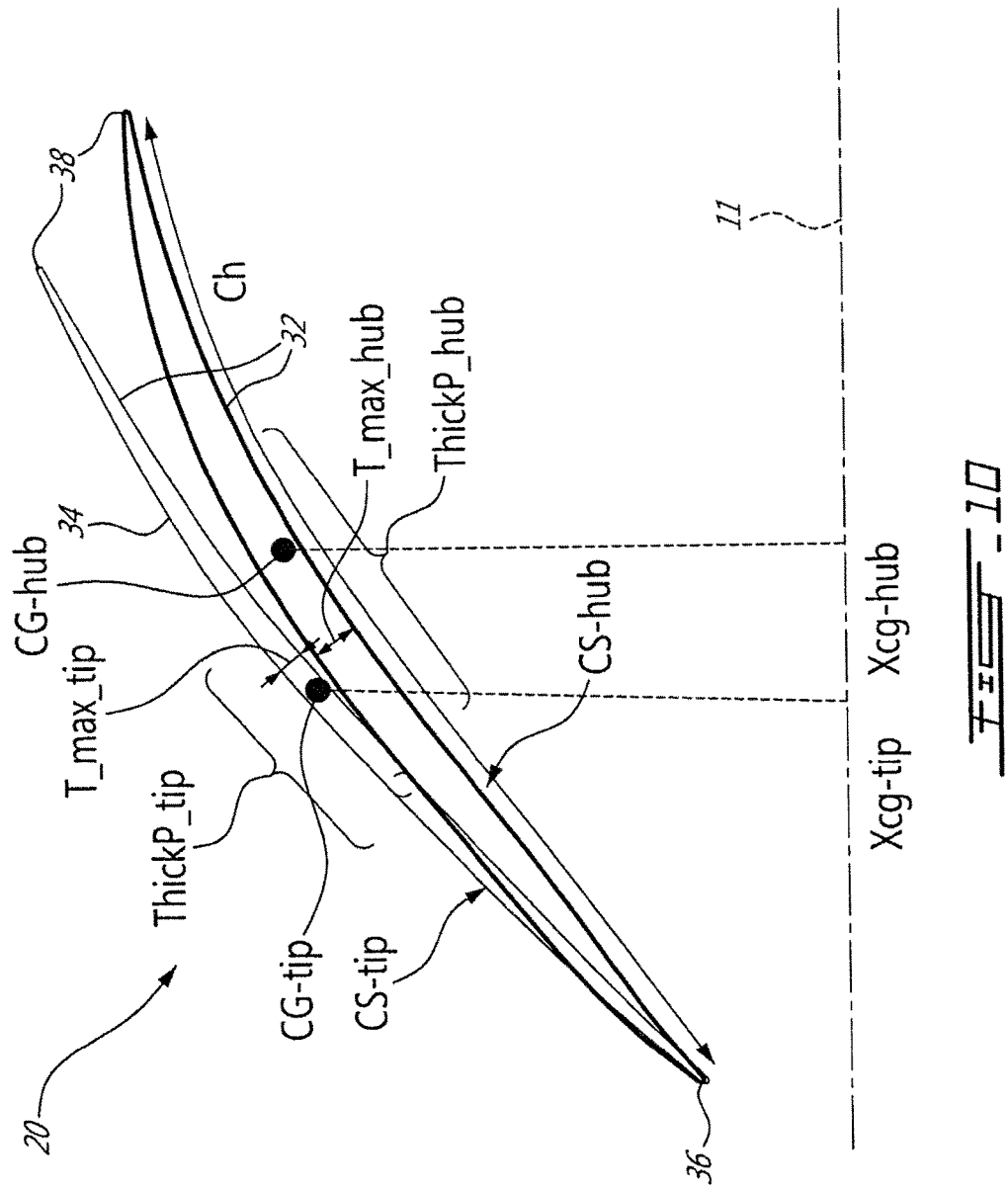
FIG. 10 is the schematic cross-sectional view taken toward the hub along line 10b-10b in FIG. 3A superimposed with a schematic cross-sectional view taken toward the tip along line 10a-10a in FIG. 3A of the blade of the compressor of FIG. 2.
Figure 11:
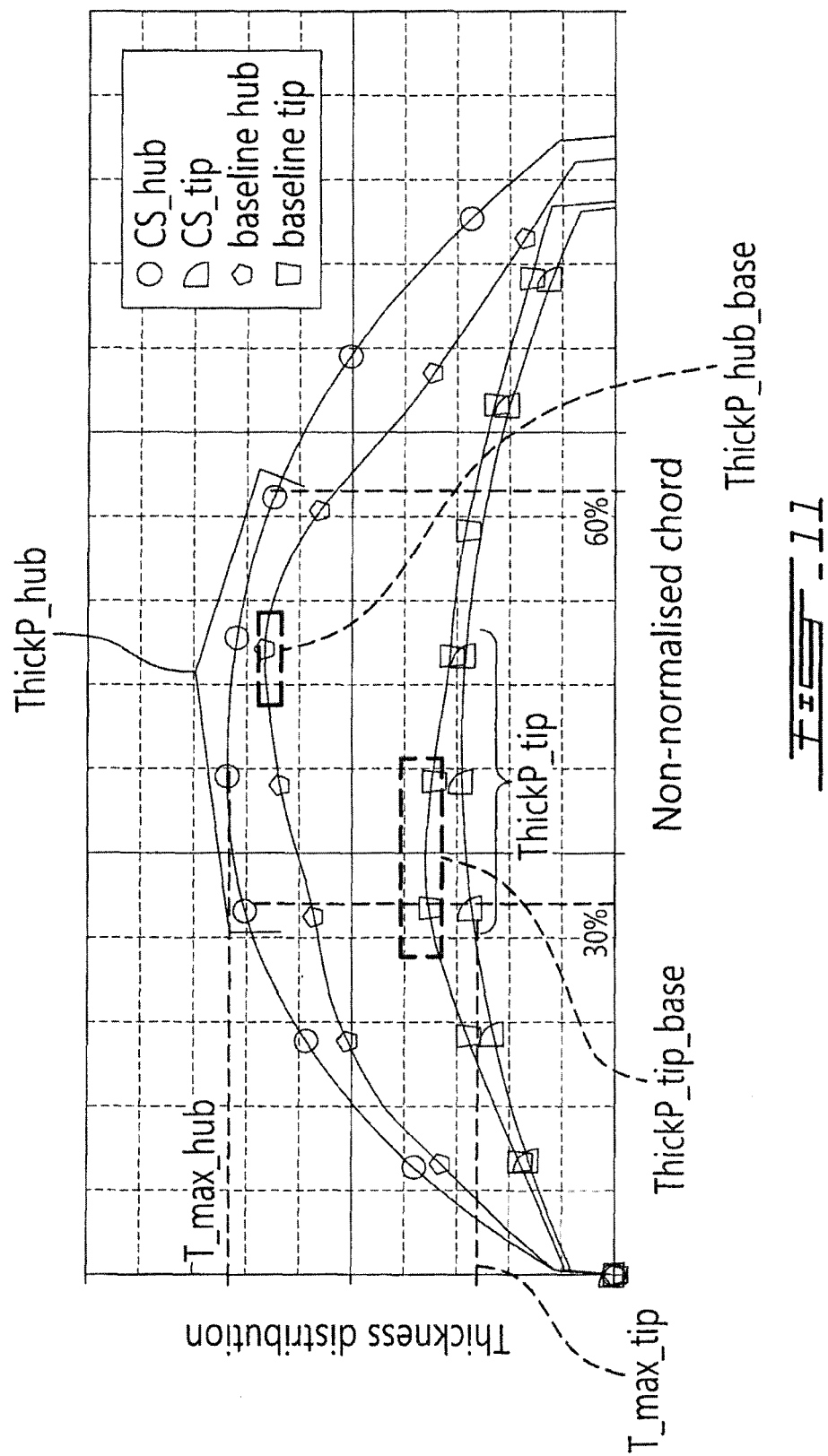
FIG. 11 is a plot of a thickness distribution of different cross-sections of the blade of the compressor of FIG. 2 versus a non-normalised chord.

Referring to FIGS. 10 and 11, one way to achieve the above feature of the Xcg distribution is to thicken the airfoil portion 26 toward the hub 21.

Referring more specifically to FIG. 10, a schematic cross-section CS-hub of the airfoil portion 26 toward the hub 21 (solid line) is shown superimposed with a schematic cross-section CS-tip of the airfoil portion 26 toward the tip 27 (dotted line). A thick portion of the airfoil portion 26 may be defined by a portion along the chord Ch of a given cross-section of the airfoil portion 26 for which the thickness is at least 85% of a maximum thickness of that airfoil portion 26, and which spans chordwise between at most between +15% and −15% from the maximum thickness. If the maximum thickness extends over an area of the chord Ch, a chordwise center of the area of maximum thickness may be used as a reference point for determining the chordwise span of the thick portion. The maximum thickness may be located at 50% of the chord Ch for a given cross-section or at a different location on that chord.

For the two cross-sections shown in FIG. 10, a thick portion ThickP_hub of the hub's cross-section CS-hub may be defined by a portion of the airfoil portion 26 along the chord Ch for which the thickness is at least 85% of the maximum thickness T max hub of the hub's cross-section CS-hub and which spans chordwise between +/− 20% from the maximum thickness T max hub. Similarly, a thick portion ThickP_tip of the tip's cross-section CS-tip may be defined by a portion of the airfoil 26 along the chord Ch for which the thickness is at least 85% of the maximum thickness T max tip of the tip's cross-section CS-tip and spans chordwise +/−15% from the maximum thickness T max tip.

It is contemplated that the thick portion of the airfoil portion 26 could be defined by a portion of the airfoil 26 along the chord Ch of a given cross-section of the airfoil portion 26 for which the thickness is about 85% of the maximum thickness of that airfoil portion 26, for example, 80%, 90% or even 92%. It is also contemplated that the thick portion could extend chordwise to less than +/−15% from the maximum thickness. For example, the thick portion could extend +/−10% chordwise from the maximum thickness.

While the cross-section CS-tip, shown herein, has a more convention airfoil shape with a thick portion being short and disposed toward the leading edge 36, the cross-section CS-hub has the thick portion ThickP_hub extending along a longer portion of the chord Ch toward the trailing edge 38. As a result, a center of gravity CG-hub is disposed axially downstream at Xcg-hub relative to the center of gravity CG-tip.

Referring now more specifically to FIG. 11, a thickness distribution of the cross-sections CS-hub and CS-tip are plotted along with baseline thickness distributions of the cross-sections at the hub 21 and at the tip 27 showing thick portion ThickP hub base of the hub and thick portion ThickP tip base of the tip. The abscises axis of the plot represents a position along a non-normalised chord Ch and the ordinates axis a thickness of the cross-sections.

The plots show that the cross-section CS-hub is globally thicker than the cross-section CS-tip, with a maximum thickness T_max_hub at the hub 21 being more than twice a maximum thickness T_max_tip at the tip 27. A distribution of the thickness at the hub 21 has been modified compared to a baseline to provide the Xcg distribution described above. In one embodiment, the thick portion ThickP_hub extends along a portion of the chord Ch comprised around between 30% and 60% of the chord Ch. In another example, the thick portion ThickP_hub extends along a portion of the chord Ch comprised around between 45% and 65% of the chord Ch. In comparison, the thick portion ThickP_tip extends along a portion of the chord Ch comprised around between 30% and 45% of the chord Ch. By designing the blade 20 with a longer thick portion ThickP_hub at the hub 21 compared to the tip 27, the center of gravity CG-hub is disposed axially downstream relative to the center of gravity CG-tip. In another example, the thick portion ThickP_hub extends between −15% and +15% of the chord Ch percentage where the maximum thickness T max hub is found. The maximum thickness T max hub may or may not be at 50% of the chord Ch.

The above thickness distribution may improve performance of the gas turbine engine 10 since frontal blockage is minimized. In addition to minimize radial flow migration hub front turning is minimized. Reduction in front turning could result in small flow area. It is thus desirable to minimize frontal thickness to have maximum flow area while more thickness is added rearward to keep root stress to acceptable level. This Xcg distribution, thus, may allow more freedom to optimize the airfoil surface curvature distribution to achieve a radial pressure distribution that can result in reduced secondary flow migration. The changes in shapes of the cross-sections CS-hub to CS-tip may be done smoothly from the hub 21 to the tip 27 by decreasing smoothly (linearly or not) the length of the thick portion.

The above description is meant to be exemplary only, and one skilled in the art will recognize that changes may be made to the embodiments described without departing from the scope of the invention disclosed. The shapes of the airfoils described herein could be used in high speed rotors as well as in low speed rotors, and could be used in rotors that are not part of a compressor section of a gas turbine engine. The rotors could have the blades integrally formed with the hub (known as blisk). The shapes of the airfoils described herein are not limited to transonic rotors. In the absence of shocks, as in subsonic designs, for rear stages of multistage compressor, both forward sweep and lean may be degrees of freedom that allow to design a blade as described above. Still other modifications which fall within the scope of the present invention will be apparent to those skilled in the art, in light of a review of this disclosure, and such modifications are intended to fall within the appended claims.

The invention claimed is:

1. A rotary airfoil of a compressor in a gas turbine engine, the airfoil comprising: opposed pressure and suction sides joined together at chordally opposite leading and trailing edges, the pressure and suction sides extending in a span direction from a root to a tip, a chord of the airfoil extending between the leading and trailing edges;
   an axial sweep of centers of gravity of the airfoil having a maximum value at the tip, the axial sweep decreasing from the maximum value at the tip to a minimum value at an intermediate position along the span between the tip and the root, and increasing from the minimum value at the intermediate position toward the root, the axial sweep increasing in a direction opposite to a direction of airflow across the airfoil;
   a continuous tangential lean of the centers of gravity of the airfoil along the span from the root to the tip in a direction of rotation of the airfoil; and
   a first center of gravity of a first cross-section of the airfoil at the tip upstream of a second center of gravity of a second cross-section of the airfoil at the root relative to the direction of airflow across the rotary airfoil.

2. The rotary airfoil of claim 1, wherein a thickness is defined across the airfoil between the pressure and suction sides, the thickness having a chord-wise distribution and a maximum thickness, a thick region of a given cross-section being defined by a thickness of at least 85% of the maximum thickness and extending from the maximum thickness towards the leading edge by a length of at most 15% of the chord and extending towards the trailing edge by a length of at most 15% of the chord, a second thick region of the second cross-section being chordally longer than a first thick region of the first cross-section.

3. The rotary airfoil of claim 2, wherein the second thick region is comprised between 30% and 60% of the chord taken from the leading edge.

4. The rotary airfoil of claim 3, wherein the first thick region is comprised between 30% and 45% of the chord taken from the leading edge.

5. The rotary airfoil of claim 1, wherein a leading edge dihedral angle is defined at a point on the leading edge between a tangent to the airfoil and a vertical, the leading edge dihedral angle having a span-wise distribution, the distribution having at least one change of direction.

6. The rotary airfoil of claim 5, wherein the at least one change of direction in the distribution of the leading edge dihedral angle is toward the tip of the blade.

7. The rotary airfoil of claim 5, wherein the distribution of the leading edge dihedral angle generally decreases from the root to the tip.

8. The rotary of claim 1, wherein a leading edge sweep angle is defined between a tangent to the airfoil and flow velocity vector at a point on the leading edge;
   a leading edge dihedral angle defined between the tangent to the airfoil and a vertical at the point on the leading edge; and
   a ratio of the leading edge sweep angle to the leading edge dihedral angle being smaller than 1.

9. The rotary airfoil of claim 1, wherein the first center of gravity is upstream of any other center of gravity of a cross-section of the airfoil relative to the direction of airflow across the rotary airfoil.

10. A gas turbine engine comprising:
    a compressor section including a plurality of rotors, each of the plurality of rotors including a hub and a plurality of blades extending radially from the hub, the hubs being aligned axially, each one of the blades including an airfoil portion, the airfoil portion comprising:
    opposed pressure and suction sides joined together at chordally opposite leading and trailing edges, the pressure and suction sides extending in a span direction from a root to a tip, a chord of the airfoil extending between the leading and trailing edges;
    an axial sweep of centers of gravity of the airfoil having a maximum value at the tip, the axial sweep decreasing from the maximum value at the tip to a minimum value at an intermediate position along the span between the tip and the root, and increasing from the minimum value at the intermediate position toward the root, the axial sweep increasing in a direction opposite to a direction of airflow across the airfoil;
    a continuous tangential lean of the centers of gravity of the airfoil along the span from the root to the tip in a direction of rotation of the airfoil; and
    a first center of gravity of a first cross-section of the airfoil at the tip upstream of a second center of gravity of a second cross-section of the airfoil at the root relative to the direction of airflow in the compressor section.

11. The gas turbine engine of claim 10, wherein a thickness is defined across the airfoil between the pressure and suction sides, the thickness having a chord-wise distribution and a maximum thickness, a thick region of a given cross-section being defined by a thickness at least 85% of the maximum thickness and extending from the maximum thickness towards the leading edge by a length of at most 15% of the chord and extending towards the trailing edge by a length of at most 15% of the chord, a second thick region of the second cross-section being chordally longer than a first thick region of the first cross-section.

12. The gas turbine engine of claim 11, wherein the second thick region is comprised between 30% and 60% of the chord taken from the leading edge.

13. The gas turbine engine of claim 12, wherein the first thick region is comprised between 30% and 45% of the chord taken from the leading edge.

14. The gas turbine engine of claim 10, wherein a leading edge dihedral angle is defined at a point on the leading edge between a tangent to the airfoil and a vertical, the leading edge dihedral angle having a span-wise distribution, the distribution having at least one change of direction.

15. The gas turbine engine of claim 10, wherein a leading edge sweep angle is defined between a tangent to the airfoil and flow velocity vector at a point on the leading edge;
    a leading edge dihedral angle defined between the tangent to the airfoil and a vertical at the point on the leading edge; and
    a ratio of the leading edge sweep angle to the leading edge dihedral angle being smaller than 1.

16. The gas turbine engine of claim 10, wherein the first center of gravity is upstream of any other center of gravity of a cross-section of the airfoil relative to the direction of airflow in the compressor section.

17. A method of forming a rotary blade of a compressor having opposed pressure and suction sides joined together at chordally opposite leading and trailing edges, a chord of the airfoil extending between the leading and trailing edges, the pressure and suction side extending in a span direction from a root to a tip, the method comprising:
    forming an airfoil having a first center of gravity of a first cross-section of the airfoil at the tip upstream of a second center of gravity of a second cross-section of the airfoil at the root relative to a direction of airflow across the airfoil, an axial sweep of centers of gravity of the airfoil having a maximum value at the tip, the axial sweep decreasing from the maximum value at the tip to a minimum value at an intermediate position along the span between the tip and the root, and increasing from the minimum value at the intermediate position toward the root, the axial sweep increasing in a direction opposite to a direction of airflow across the airfoil, and a continuous tangential lean of the centers of gravity of the airfoil along the span from the root to the tip in a direction of rotation of the airfoil.

18. The method of claim 17, wherein forming the airfoil comprises forming the airfoil with a thickness defined across the airfoil between the pressure and suction sides, the thickness having a chord-wise distribution and a maximum thickness, a thick region of a given cross-section being defined by a thickness at least 85% of the maximum thickness and extending from the maximum thickness towards the leading edge by a length of at most 15% of the chord and extending towards the trailing edge by a length of at most 15% of the chord, a second thick region of the second cross-section being chordally longer than a first thick region of the first cross-section.

19. The method of claim 18, wherein the second thick region is comprised between 30% and 60% of the chord taken from the leading edge.

20. The method of claim of claim 19, wherein the first thick region is comprised between 30% and 45% of the chord taken from the leading edge.

* * * * *